United States Patent [19]
Tamegaya

[11] Patent Number: 6,075,529
[45] Date of Patent: Jun. 13, 2000

[54] GUI AUTOMATIC GENERATING SYSTEM FOR INPUTTING DATA OF A MANUFACTURING PROCESS

[75] Inventor: Yukio Tamegaya, Tokyo, Japan

[73] Assignee: NEC Corporation, Tokyo, Japan

[21] Appl. No.: 09/023,215

[22] Filed: Feb. 13, 1998

[30] Foreign Application Priority Data

Feb. 14, 1997 [JP] Japan ................................. 9-030308

[51] Int. Cl.[7] ..................................................... G06F 3/14
[52] U.S. Cl. ........................ 345/335; 345/333; 345/334; 345/339; 345/349; 345/965; 700/83
[58] Field of Search ................................... 345/333, 334, 345/335, 339, 348, 349, 964, 965; 364/188

[56] References Cited

U.S. PATENT DOCUMENTS

| | | | |
|---|---|---|---|
| 5,371,683 | 12/1994 | Fukazawwa et al. | 395/500 |
| 5,576,946 | 11/1996 | Bender et al. | 364/188 |
| 5,703,788 | 12/1997 | Shei et al. | 345/433 |
| 5,740,341 | 4/1998 | Oota et al. | 345/420 |
| 5,745,092 | 4/1998 | Ito | 345/95 |
| 5,796,401 | 8/1998 | Winer | 345/433 |

FOREIGN PATENT DOCUMENTS 7-219753   8/1995   Japan .

OTHER PUBLICATIONS

"UX Software–Japanese Mf Programming Guideline" *NEC Corporation* pp. 51–66 (Jan. 1993.).

*Primary Examiner*—Raymond J. Bayerl
*Assistant Examiner*—Thomas T. Nguyen
*Attorney, Agent, or Firm*—Foley & Lardner

[57] ABSTRACT

When an LSI manufacturing process is to be input by a simulation system, a format reading and analyzing section selectively reads a format of one stop of the manufacturing process from format data unit, and interprets GUI parts and analyzes a simulator input format. Based on a result of the interpretation and analysis, a GUI automatic layout determines a GUI part to be used from the limited GUI parts, automatically calculates coordinates with a regularity held in the layout and displays an input window of the manufacturing process. In this case, when there has been an input operation of a GUI, a call back function is called, input data of the GUI is read from a window system, and a data interface converts the input data into an input format of simulation data based on the format data and transfers the input format to a simulation system. With this arrangement, when the window layout for inputting the LSI manufacturing process is to be added or changed, it becomes possible to obtain a GUI automatic generating system by changing only the format file, without changing or re-compiling the program for GUI and the call back function.

6 Claims, 6 Drawing Sheets

SIMULATOR INPUT FORMAT
GUI LAYOUT INFORMATION

DEPOSITION : DEPO(mat)THIC=(thic)X1=(x1)X2=(x2)

NAME OF SUBSTANCE : PB(mat){OXID, NITR, POLY}

FILM THICKNESS : TX(thic) [μm]

RANGE : [FROM] TX(x1) [TO] TX(x2)

EXAMPLE OF FORMAT DATA

FIG. 4

INPUT OF MANUFACTURING PROCESS BY SIMULATION SYSTEM

| GENERATION OF A PROCESS FLOW | | |
|---|---|---|
| NAME OF PROCESS | PROCESS CONDITIONS | |
| DEPOSITION | OXID THIC=0.1  X1=1.0  X2= | |
| | | |

| INSERT | DELETE | COPY | ALTER | END |

↑

AUTOMATICALLY GENERATED WINDOW

| DEPOSITION |
|---|
| NAME OF SUBSTANCE: [OXIDE FILM] [NITRIDE FILM] [POLY-SILICON] |
| FILM THICKNESS: [0.1] μm |
| RANGE : FROM [1.0] TO [1.5] |
| CANCEL          END OF SETTING |

GUI LAYOUT DIAGRAM

GUI AUTOMATIC GENERATING SYSTEM FOR INPUTTING DATA OF A MANUFACTURING PROCESS

BACKGROUND OF THE INVENTION

1. Field of the Invention

The present invention relates to a GUI (Graphical User Interface) automatic generating system for inputting data of a manufacturing process of an LSI in an LSI simulation system, by using a GUI, and relates more particularly to a GUI automatic generating system for generating a GUI layout of a data input window in accordance with format data.

2. Description of Related Art

A GUI automatic generating system of this type has so far been structured as a system as shown, for example, in the Japanese Patent Application Laid-open Publication No. 7-219753. FIG. 1 is a block diagram for showing the principle of this prior-art technique. In accordance with an instruction from an application program 301, a window system 302 generates parts for a GUI based on an assigned resource within a resource file 303. The resource file 303 corresponds to each GUI structured by a plurality of parts, and has a structure description resource 304 for describing types of parts for constituting the GUI and a relationship between the respective parts with identifiers attached thereto, and information relating to a call back processing to be executed when each part has been operated. Upon receiving a request for generating a GUI from the application program 301, a data input system refers to a corresponding resource within the resource file 303 and makes a decision as to whether this resource is the structure description resource 304 or not by a judgement unit 305 based on the presence or absence of an identifier.

In this decision, types of parts for constituting the corresponding GUI and the relationship between the parts are analyzed based on a description shown by an identifier included in the structure description resource 304 in accordance with a result of the decision that the referred resource is the structure description resource. In accordance with a result of this analysis, an analysis processing unit 306 requests the window system 302 to carry out a processing for generating the respective parts. When a decision is that the referred resource is not the structure description resource, a repeating unit 307 repeats the request for generating the GUI to the window system 302.

As explained above, according to the prior-art technique, layout information of a GUI and call back information are described in the resource file 303, and the change of the GUI layout can be done by only changing the resource file 303.

However, according to the above-described prior-art technique, although an addition or a change of the GUI layout can be done by changing the resource file, there is a problem that in order to change input data to a simulator input format, it is necessary to add or change a call back function and to re-compile the function so that the software development becomes complex. This is because, according to the prior-art technique, although the resource file has layout information and call back information corresponding to each part of the GUI, the call back function does not include a function for changing input data into a simulation input format.

SUMMARY OF THE INVENTION

It is an object of the present invention to provide a GUI automatic generating system for automatically generating a GUI layout from abstract format data without changing a program and for automatically converting input data into a simulator input format.

A GUI automatic generating system according to the present invention is provided in a simulation system having an input function of an LSI manufacturing process structured an a window system such as a work station or the like. The GUI automatic generating system includes a format data unit for storing a format data for describing GUI layout information of an input window corresponding to each step of the LSI manufacturing process and input format of a simulator; a format reading and analyzing section for selectively reading a format of one of the steps of the LSI manufacturing process from the format data unit and analyzing this format; a GUI automatic layout section for determining one GUI part to be used from a limited group of GUI parts and for automatically calculating layout coordinates, a call back function unit for reading data corresponding to an input operation of a GUI from the format data; and a data interface section for arranging data input on a GUI based on a simulator input format in the format data unit.

According to the present invention, when a parameter of a certain step of a manufacturing process is to be input, an addition of a new window and a change of a layout can be done by only changing the format data, by the operation of reading format data of the corresponding step of the manufacturing process from the format data unit, displaying a window for inputting the parameter of manufacturing conditions, and obtaining simulation input data converted into an input format of a simulator after a data input operation. With the above-described operation, it is not necessary to change or re-compile programs for a GUI, a call back function and a data interface, at the time of adding or changing the GUI layout.

In this case, it is desirable that the GUI automatic layout section of the present invention has a display control for calling respective blocks of a label display, a text input and a button change-over by deciding a type of a GUT part and calculating layout coordinates, generating a GUT layout, and sending window display data to the window system. It is also desirable that the GUI automatic generating system has an operating system for sending input data to the window system when there has been an input operation from a keyboard or a mouse and for making a window display of the GUI layout in a display unit based on the window display data when the GUI layout has been input. Further, it is desirable that the GUI automatic generating system has a data editing unit for displaying a GUT by automatically deciding format data based on process data from a simulation system and for analyzing a simulation input format, extracting data to be displayed on the GUI and displaying data in each part of the GUI.

BRIEF DESCRIPTION OF THE DRAWINGS

FIG. 4 is a GUI layout diagram.

DETAILED DESCRIPTION OF THE PREFERRED EMBODIMENTS

Figure 2:
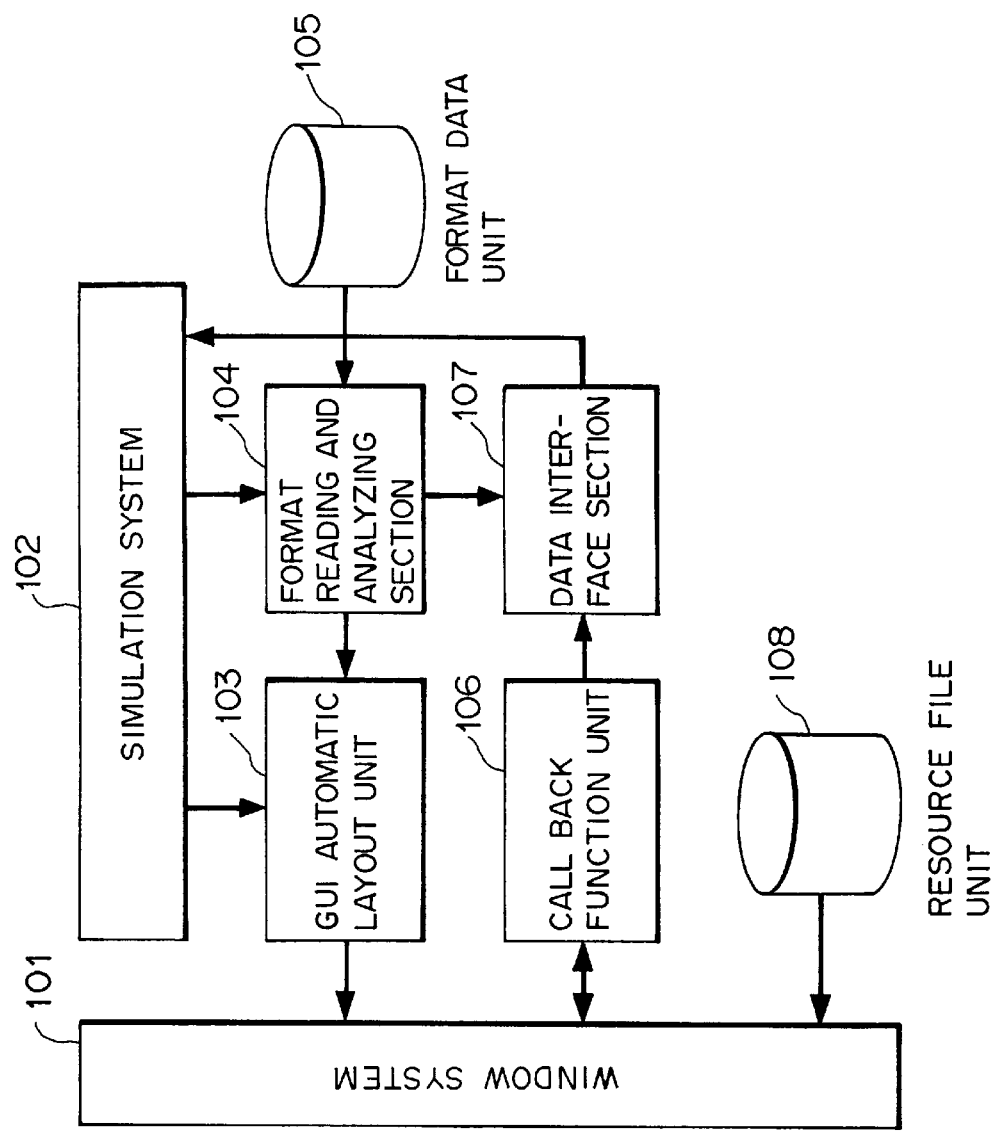
FIG. 2 is a block diagram for showing the basic principle of the present invention.

Embodiments of the present invention will be explained below with reference to the drawings. The basic principle of the present invention will be explained first based on FIG. 2. A GUI automatic generating system structured on a window system such as a work station or the like is shown in FIG. 2. Referring to this drawing, 101 denotes a window system, and a simulation system 102 carries out a physical analysis and an electrical analysis within a device, with a manufacturing process of an LSI as an input. Format data unit 105 stores a format data which describes layout information of an input window corresponding to each step of the manufacturing process and an input format of a simulator. A resource file unit 108 stores a resource file describes a size and a color of each GUI part. When the LSI manufacturing process is to be input by the simulation system 102, a format reading and analyzing section 104 selectively reads a format of one step of the manufacturing process from the format data unit 105, and interprets GUI parts and analyzes a simulator input format. Based on a result of the interpretation and analysis, a GUI automatic layout unit 103 determines a GUI part to be used from the limited GUI parts, automatically calculates coordinates with a regularity held in the layout and displays an input window of the manufacturing process. In this case, when there has been an input operation of a GUI, a call back function unit 106 is called, input data of the GUI is read from the window system 101, and a data interface unit 107 converts the input data into an input format of simulation data based on the format data and transfers the input format to the simulation system 102. The call back function unit 106 is prepared by the number of types of GUI parts in advance, and these functions are shared, by assigning an address of a data storage area at the time of calling.

As explained above, according to the present invention, the GUI parts to be used are limited, a regularity in held in the layout, and the call back functions are shared. With this arrangement, it becomes possible to change the GUI layout by changing only the format data.

Figure 3:
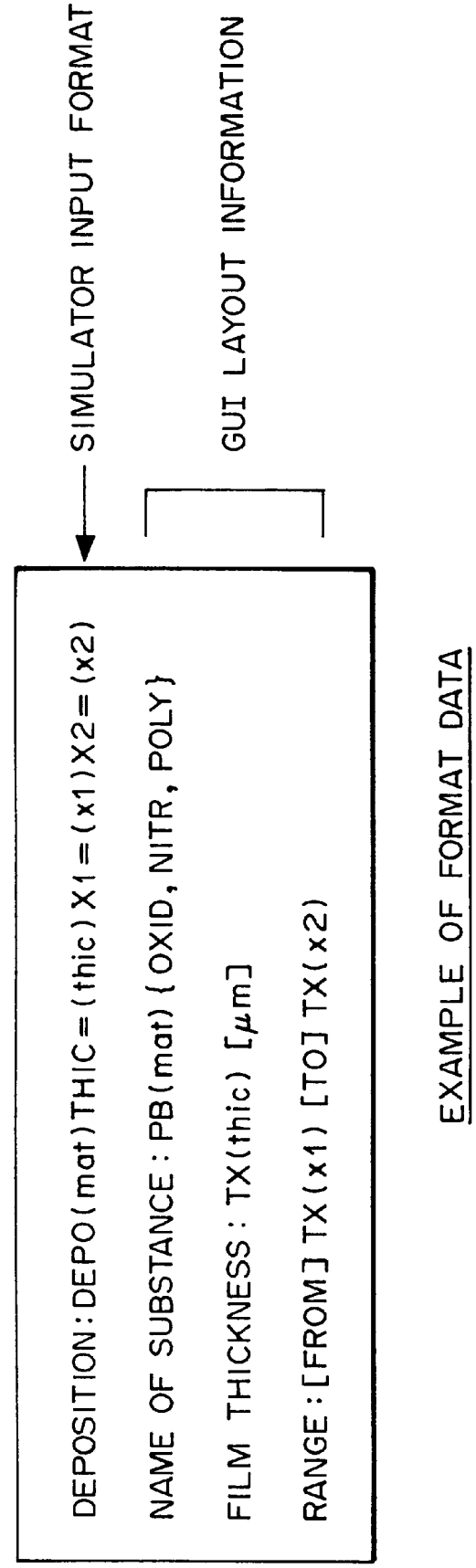
FIG. 3 is an example of format data.

The contents of the format data shown in FIG. 3 will be explained below with reference to the GUI layout shown in FIG. 4, as an example. In FIG. 4, the simulation system edits a process flow of an LSI manufacturing process with a display, and automatically generates a window by applying the present invention to the input of process conditions of deposition A first row of the format data in FIG. 3 is an input format of the simulator. A second row is for selecting names of substances, and, in this case, the second row means that three names of OXID, NITR and POLY are displayed as parts by using a push button and the selected names are substituted into an input format (mat). A third row is for assigning a film thickness, and this row means that a unit [$\mu$m] is displayed by using a text input part and the input data is substituted into (thic) of the input format. A fourth row similarly shows the case of having arranged two text parts laterally.

Figure 1:
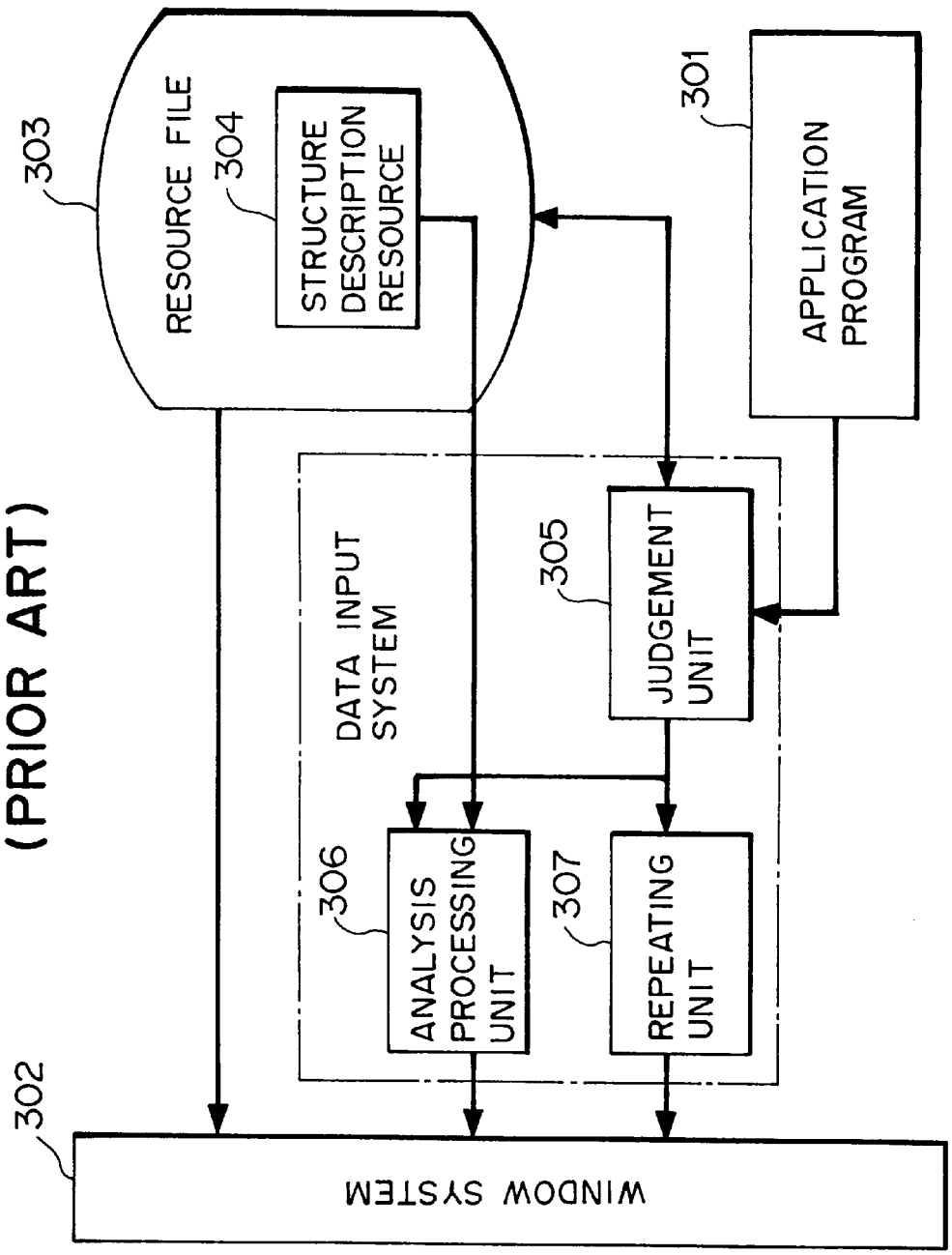
FIG. 1 is a structural diagram of a prior-art technique.
Figure 5:
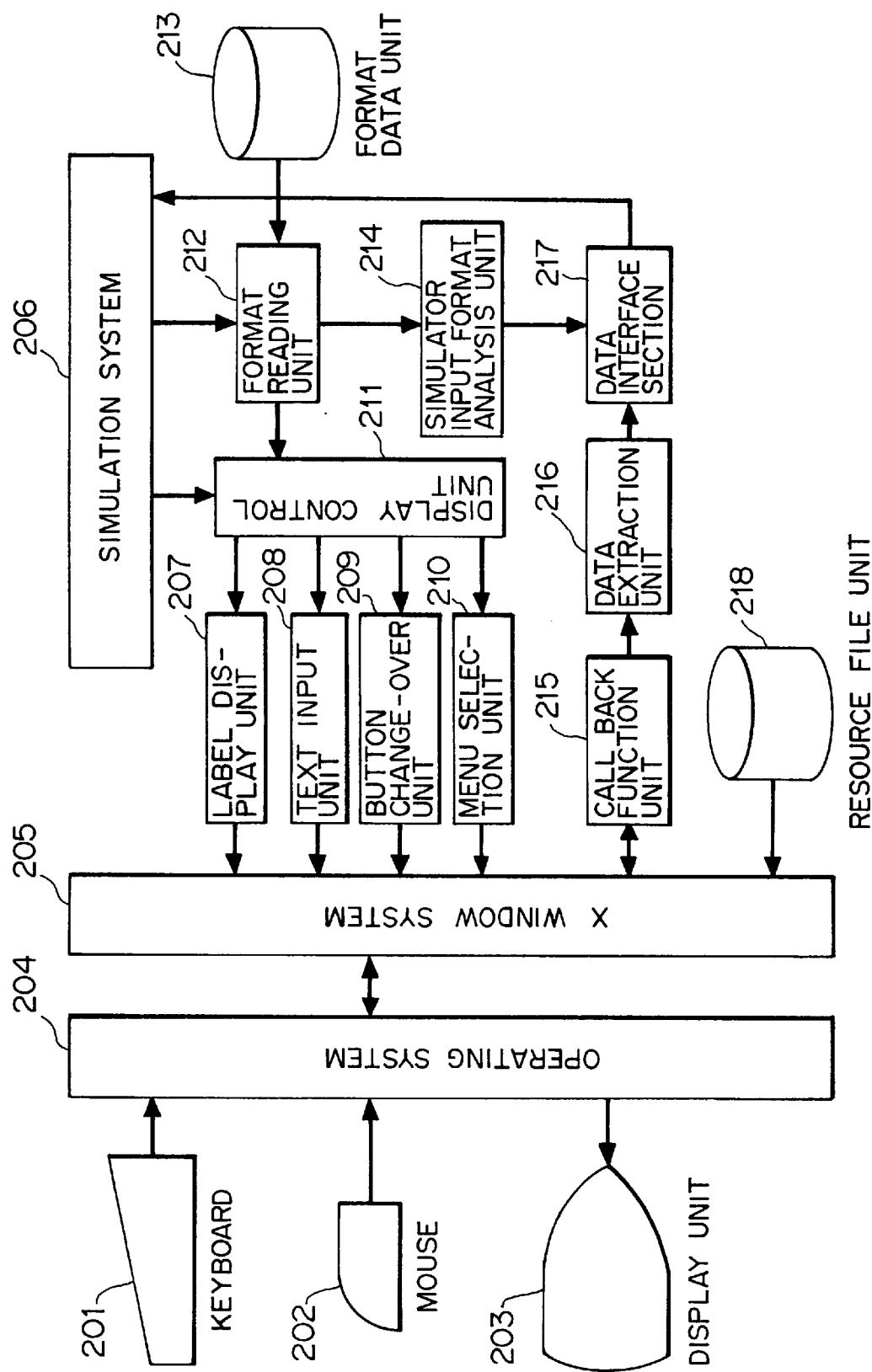
FIG. 5 is a structural diagram of a first mode of implementation of the present invention.

Next, a first mode of implementation of the present invention shown in FIG. 5 will be explained. Referring to FIG. 5, an X window system 205, a simulation system 206, format data unit 213 and a resource file unit 218 correspond respectively to the window system 101, the simulation system 102, the format data unit 105 and the resource file unit 108 shown in FIG. 1. A format reading unit 212 and a simulation input format analysis unit 214 correspond to the format reading and analyzing section 104 shown in FIG. 2. Further, a call back function unit 215 and a data interface unit 217 correspond to the call back function unit 106 and the data interface unit 107 shown in FIG. 2, and a data reading unit 216 is provided between the both in this case. Further, a label display unit 207, a text input unit 208, a button change-over unit 209, a menu selection unit 210 and a display control unit 211 correspond to the GUI automatic layout 103 shown in FIG. 2. Then, an operating system 204 is connected to the X window system 205, and a keyboard 201, a mouse 202 and a display unit 203 are connected to the operating system 204 respectively.

In the above-described structure, when the simulation system 206 has been started and an LSI manufacturing process is to be input, the window shown on the left side of FIG. 4 is displayed. In this case, when the process conditions of the deposition are to be input, the simulation system 206 instructs the format reading unit 212 to read the format data of the deposition shown in FIG. 3 from the format data unit 213. The display control unit 211 decides types of parts, calculates layout coordinates, calls blocks of the label display unit 207, the text input unit 208 and the button change-over unit 209 respectively, generates a GUI layout and transfers the window display data to the operating system 204 through the window system 205, and the display unit 203 displays the window shown on the right side in FIG. 4. In this case, when there has been an input operation by the keyboard 201 or the mouse 202, the input data is sent to the X window-system 205 through the operating system 204, and the call back function unit 215 is called so that a processing corresponding to the respective parts is carried out. After a targeted data has been taken out by a data extraction unit 216, this data is converted into an input format shown in FIG. 3 by the data interface 217 based on an instruction from the simulator input format analysis unit 214, and the input format is then transferred to the simulation system 206. In the manner as described above, the data set on the automatically prepared window is automatically converted into a simulator input format, and is displayed on a process flow generation window of the simulation system 206.

Figure 6:
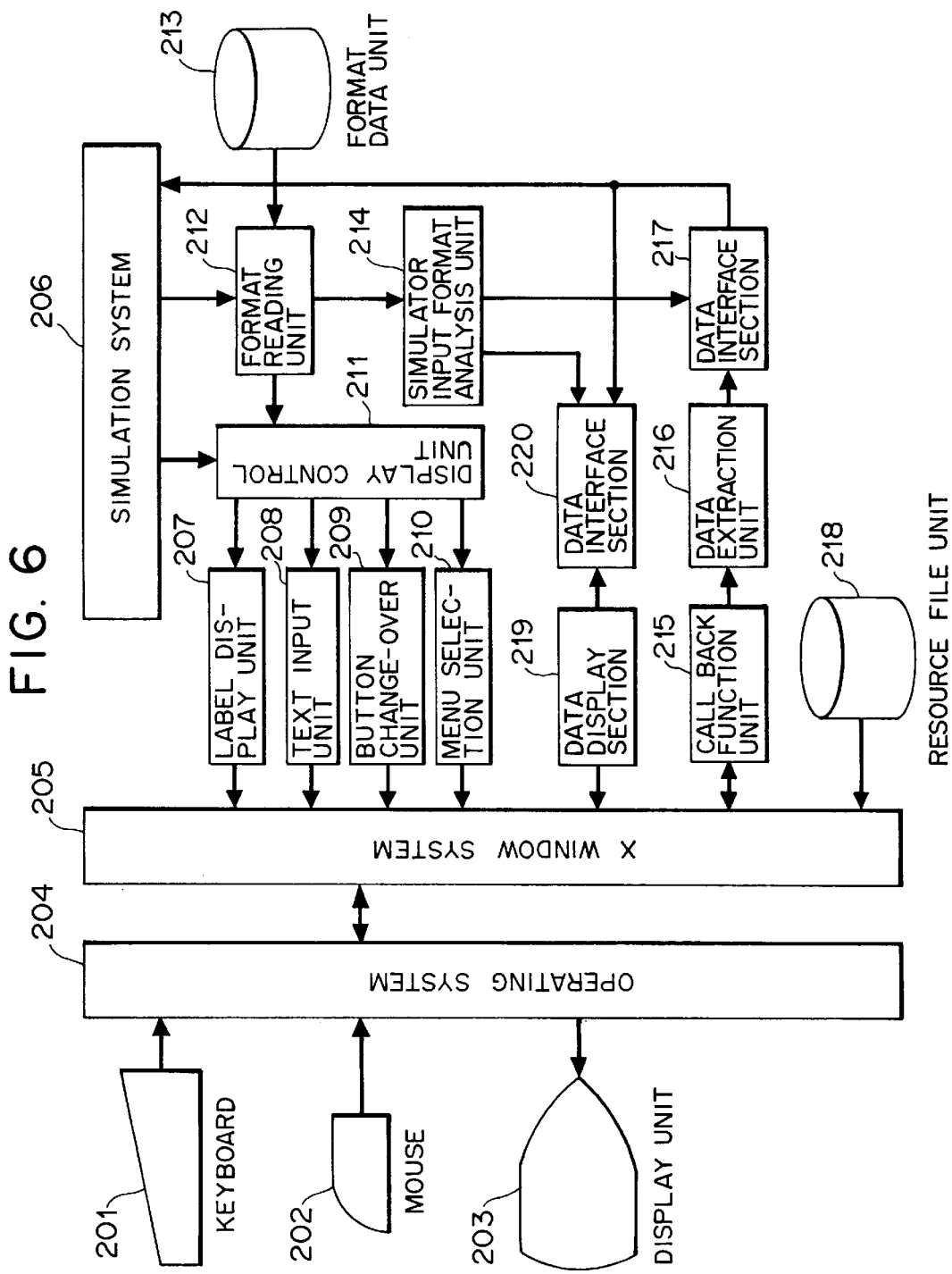
FIG. 6 is a structural diagram of a second mode of implementation of the present invention.

FIG. 6 is a structural diagram of a second node of implementation of the present invention. This mode of implementation is the one where a data editing function is added to the simulation system of the first mode of implementation shown in FIG. 5, and a data display section 219 and a data interface unit 220 are added to the structure of the first mode of implementation. In this second mode of implementation, when a data editing is to be carried out, process data is sent from the simulation system 206 and the format data is automatically decided so that GUI are displayed in a similar manner to that of the first mode of implementation. The simulator input format is analyzed in a similar manner, and the data to be displayed on each GUI is extracted by the data interface unit 220. Then, the data display section 219 displays data to each GUI part. After the data editing, the data is processed in a similar manner to that of the first mode of implementation, and is then sent to the simulation system and displayed.

As explained above, according to the present invention, in order to prepare a window for inputting a manufacturing process of LSI, the format data describing the GUI layout information of the input window for each step of the manufacturing process and the input format of the simulator is read, and the GUI parts to be used are limited, and the GUI layout is automatically generated, with a regularity held in the layout, so that the GUI layout can be changed by changing only the format data. Further, by sharing the call back function and by incorporating in the system the data interface for carrying out the data conversion by analyzing the simulator format within the format data, it becomes unnecessary to change the call back function. When there is a new addition or a change of a step of the LST manufacturing process, it has become possible to cope with this promptly by changing only the format data, with a reduction in the work volume required for this change by one half or more of that required according to the prior-art technique.

What is claimed is:

1. A GUI automatic generating system, in a simulation system having an input function of an LSI manufacturing process structured on a window system, comprising:

a format data unit, for storing format data for describing GUI layout information of an input window corresponding to each step of said LSI manufacturing process and for storing an input format of a simulator;

a format reading and analyzing sections for selectively reading a format of one of a plurality of steps of said LSI manufacturing process from said format data and analyzing said format;

a GUI automatic layout section, for determining one GUI part to be used from a limited group of GUI parts and for automatically calculating layout coordinates;

a call back function unit, for reading data corresponding to an input operation of a GUI from said format data; and a data interface section for arranging data input on a GUI, based on a simulator input format in said format data.

2. A GUI automatic generating system according to claim 1, wherein said GUI automatic layout section comprises:

a display control unit for calling respective blocks of a label display, a text input, and a button change-over by deciding a type of a GUI part and for calculating layout coordinates, generating a GUI layout, and sending a window display data to said window system.

3. A GUI automatic generating system according to claim 2, further comprising:

an operating system for sending input data to said window system when there has been an input operation from at least one of a keyboard and a mouse, and wherein said operating system generates a window display of said GUI layout in a display unit based on said window display data when said GUI layout has been input.

4. A GUI automatic generating system according to claim 2, further comprising:

a data editing unit for displaying a GUI by automatically deciding said format data based on process data from a simulation system, and for analyzing a simulation input format, extracting data to be displayed on said GUI, and displaying data in each part of said GUI.

5. A GUI automatic generating system according to claim 3, further comprising:

a data editing unit for displaying a GUI by automatically deciding said format data based on process data from a simulation system, and for analyzing a simulation input format, extracting data to be displayed on said GUI, and displaying data in each part of said GUI.

6. A GUI automatic generating system according to claim 1, wherein the window station comprises a computer work station.

* * * * *